United States Patent
Flieder et al.

[15] 3,681,613
[45] Aug. 1, 1972

[54] TIMING CIRCUIT

[72] Inventors: Robert A. Flieder, Englewood Cliffs, N.J.; Louis L. Weisglass, New York, N.Y.

[73] Assignee: Berkey Photo, Inc., New York, N.Y.

[22] Filed: May 28, 1970

[21] Appl. No.: 41,294

[52] U.S. Cl. .............. 307/141.4, 307/133, 317/141
[51] Int. Cl. ........................................... H01h 3/34
[58] Field of Search...307/141.4, 141, 132 R, 132 M, 307/293; 317/141 R, 142 S, 142 R

[56] References Cited

UNITED STATES PATENTS

| | | | |
|---|---|---|---|
| 3,398,295 | 8/1968 | Fathauer | 307/141.4 |
| 3,457,464 | 7/1969 | Wallentowitz | 317/142 |
| 3,189,751 | 6/1965 | Winchel | 307/88.5 |
| 3,355,632 | 11/1967 | Wallentowitz | 317/142 |
| 3,456,131 | 7/1969 | Adem | 307/293 |
| 3,165,648 | 1/1965 | Sainsbury | 307/293 |
| 3,423,600 | 1/1969 | Pringle | 307/132 |

*Primary Examiner*—J. V. Truhe
*Assistant Examiner*—Gale R. Peterson
*Attorney*—Toren and McGeady

[57] ABSTRACT

Timing circuit including a R-C circuit connected in parallel with a voltage divider across a direct current supply. Voltage sensing means is connected between the midpoints of the R-C circuit and the voltage divider. Upon the occurrence of equal voltages at these points the timed interval is completed. The circuit is operative under variations in magnitude of the supply voltage.

15 Claims, 3 Drawing Figures

INVENTORS
ROBERT A. FLIEDER
LOUIS L. WEISGLASS
BY Edward F. Connors
ATTORNEY

TIMING CIRCUIT

The present invention relates to electrical timing circuits and more particularly to an inexpensive R-C timing circuit providing a timed output for periods ranging from two-tenths of a second to about 60 seconds, an embodiment of the invention may be made self-oscillating to provide a series of timed intervals.

Heretofore R-C timing circuits have required precisely determined voltage supplies for accurate operation of the R-C timing circuits. In order to provide the precise voltage use has been had of regulators or zener diodes.

The present invention aims to provide an inexpensive timing circuit using the R-C circuit principle and which is not affected by voltage variations.

In accordance with the invention a timing circuit is provided in which a R-C circuit is connected in parallel with a voltage divider formed of a pair of series connected resistors. Voltage reference points are respectively provided at the junction between the capacitor and its resistor, and at the junction of the resistors of the voltage divider. Potential sensing means is used to determine the end of the timed interval when equal voltages exist between the test points. In one form of the invention a load switch may be actuated into either the open or closed position, while in another form the invention may be used as a self-oscillating circuit for the production of equally spaced pulses.

In accordance with the invention either the capacitor or the resistor or both components of the R-C circuit may be made variable in order to provide a plurality of ranges of timed intervals.

The timing circuit in accordance with the invention is advantageous in that it may be alternatively used as a timer, or as an oscillator using R-C timing for frequency determination.

Other objects and advantages of the invention will be apparent from the following description and from the accompanying drawing which shows, by way of example, an embodiment of the invention.

Figure 1:
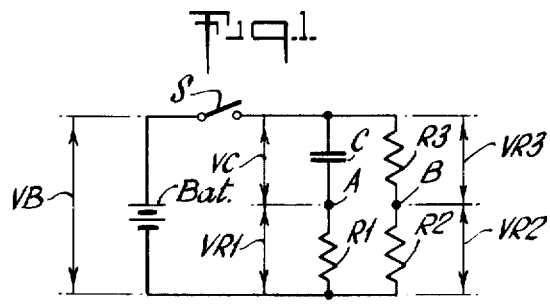
FIG. 1 is a schematic circuit illustrating the principle of operation of the invention.

It is believed the circuit of the invention will be most readily understood by considering its principle of operation by referring to FIG. 1. A direct current source or battery Bat. having a voltage VB is connected through a switch S across a R-C circuit of capacitor C and resistor R1. Either or both of these components may be variable. The voltage across the capacitor C is indicated as Vc while the voltage across the resistor R1 is indicated as VR1. A voltage divider formed of a pair of series connected resistors R2 and R3 is connected in parallel with the R-C circuit. The voltage across the resistor R2 is indicated as VR2 while the voltage across the resistor R3 is indicated as VR3. Voltage reference points are indicated as A and B.

The well known formula for the charge on a capacitor is:

$$VC = VB\left(1 - \epsilon^{-\frac{t}{R1C}}\right) \quad \text{Equation No. 1}$$

Solving for t, $$t = R1\, C \ln(VB/VB - VC) \quad \text{Equation No. 2}$$

Since $VR1 = VB - VC$, then $$t = R1\, C \ln(VB/VR1) \quad \text{Equation No. 3}$$

For the voltage divider, $$VB/VR2 = R2 = R3/R2$$

At the time when the voltage at A and B are equal, $$VR1 = VR2, \text{ we have}$$

$$t = R1\, C \ln(R2 + R3/R2) \quad \text{Equation No. 4}$$

Thus the time interval is dependent only on the values of the resistors and condenser, and independent of variations in VB.

In the circuit of FIG. 1, starting with a discharged capacitor C at the instant that the switch S is closed, the time for the capacitor voltage at A to equal the voltage on the midpoint of the voltage divider at B is independent of the magnitude of the supply voltage. In other words, the same length of time is required to produce equal voltages at reference points A and B irrespective of variations in the magnitude of the supply voltage.

Equal voltage at reference points A and B may be determined by connecting a voltmeter therebetween. The time to reach equal voltages may be determined by a stop watch or the like and the capacitor C and/or the resistor R may be varied to obtain the desired time interval.

Figure 2:
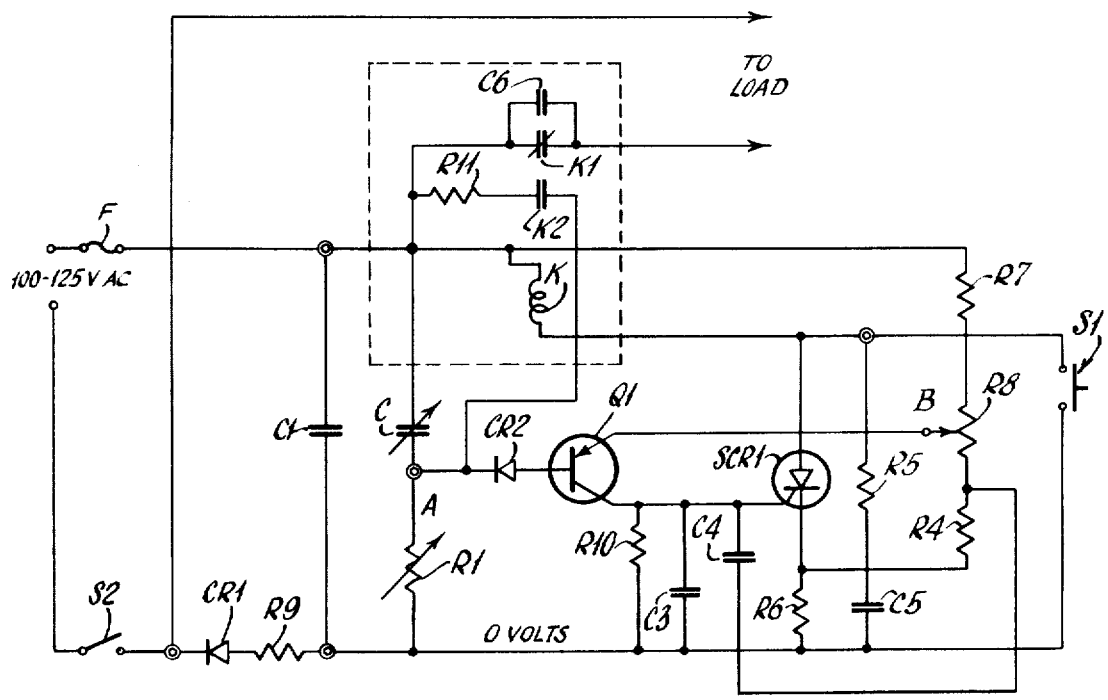
FIG. 2 is a schematic circuit illustrating a commercial embodiment of the invention.

Referring to FIG. 2 there is a schematic diagram of a commercial embodiment of a circuit in accordance with the invention and which is particularly suitable for the timing of exposures in photographic processing. The same indicia is used as in FIG. 1 where feasible.

The circuit in accordance with FIG. 2 is adapted to be connected to a source of alternating current which may have a voltage of 100 to 125 volts. The circuit may be protected by a fuse F. An ON - OFF switch S2 is used to energize the circuit. A direct current supply source is provided by rectifying diode CR1 connected through resistor R9 to provide about 150 volts direct current across filtering capacitor C1.

Main capacitor C and main resistor R1, as stated before, may be variable, or may be fixed or stepped units. Voltage divider R4, R7 and R8 is arranged with reference point B as a movable contact on potentiometer R8 to provide means for adjustment. The voltage divider R4, R7 and R8 of FIG. 2 corresponds to the voltage divider R2 and R3 of FIG. 1.

The circuit of FIG. 2 incorporates a relay having a coil K operating two pairs of contacts K1 and K2. Load contacts K1 are normally closed while contacts K2 are normally open. However, as will be explained later load contacts K1 alternatively might be arranged to be normally open. The coil K of the relay may be energized through push button manual starting switch S1. A controlled rectifier SCR1 is connected in parallel with switch S1 through a resistor R6 providing negative bias on the SCR1 cathode. Resistor R6 also is connected in series with the voltage divider string R4, R7 and R8. Normally open contact K2 is connected across capacitor C in series with a resistor R11.

In order to determine equal potential between points A and B potential equalization responsive means is used including a transistor Q1 having its base connected through a diode CR2 to the reference point A. The transistor emitter is connected to the reference point B and its collector is connected to the triggering electrode or gate of SCR1. Also connected to the collector are load resistor R10, filtering capacitor C3, and capacitor C4 connected to the voltage divider R4, R7 and R8. Capacitor C4 is used to provide a triggering pulse for the controlled rectifier SCR1. The anode of SCR1 is filtered by series connected resistor R5 and capacitor C5. A capacitor C6 is connected across the normally closed contacts K1 as an arc suppressor.

In the operation of the timing circuit shown in FIG. 2 it is connected to a load which may be a photographic processing lamp and which is to be operated for a predetermined time interval. Suitable values of capacitor C and resistor R1 are set to provide the desired time interval.

Upon the closing of the switch S2 a direct current voltage of about 150 volts is available across the filtering capacitor C1. The rising voltage across the voltage divider string is coupled through the capacitor C4 to the gate of the controlled rectifier SCR1 to trigger it on. Upon the stabilization of the circuit relay coil K is energized as the controlled rectifier SCR 1 becomes conducting. Normally closed contact K1 is opened and normally open contact K2 is closed thereby discharging capacitor C through resistor R11.

The circuit is then ready for the starting of a timed interval which is commenced by closing and opening the manual switch S1. Upon the closing of switch S1 the controlled rectifier SCR1 is commuted and upon the release of switch S1, the relay coil is deenergized allowing the contacts K1 and K2 to go to normal position commencing the timed interval at which time the contact K1 is closed supplying power to the load and contact K2 is opened allowing capacitor C to become gradually charged.

During the charging of capacitor C the reference point A is higher in potential than the point B and the base to emitter junction of the transistor and the diode CR2 are back-biased and no base current flows. At the beginning of the timing cycle the point B might be typically 20 volts above the zero voltage leg and the capacitor C is completely discharged which would cause the point A to be 150 volts above zero volt leg. In this case the base to emitter junction in its back biased condition might be subjected to 130 volts which would be well above its rating. However, the diode CR2 connected in the base circuit blocks the high voltage from the transistor junction.

After the passage of the predetermined time interval the voltages at the reference points A and B are equal for practical purposes (of course there must be a slight voltage across the diode and the base-emitter junction for current to flow) and the transistor Q1 goes from being back biased into the condition of forward biased and base current flows. The transistor Q1 is acting as a current amplifier resulting in the flow of collector current which triggers the controlled rectifier SCR1. The relay K is then actuated causing contacts K1 to become opened terminating the flow of current to the load. Also the contacts K2 are closed causing the capacitor C to become discharged. The circuit is then ready for producing another timed interval upon actuation of the manual switch S1.

Figure 3:
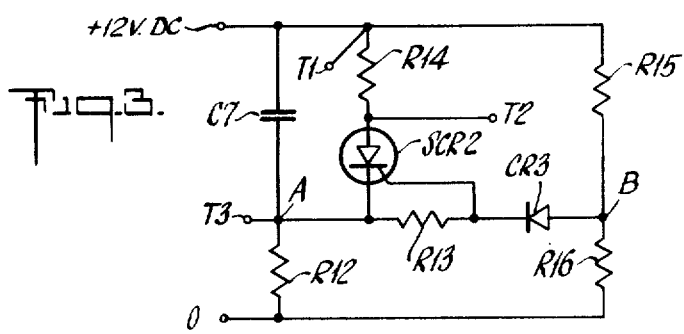
FIG. 3 is a schematic circuit illustrating a commercial embodiment of the invention used as an oscillator.

The timing circuit in accordance with the invention is shown used as a self oscillating circuit in FIG. 3 in which capacitor C7 corresponds to the capacitor C of FIG. 1, resistor R12 corresponds to the resistor R1, resistor R15 to the resistor R3 and resistor R16 to the resistor R2. Potential equalization sensing means is connected between the reference points A and B and includes a current limiting resistor R13 connected in series with diode CR3. A controlled rectifier SCR2 is connected in series with a resistor R14 across capacitor C7. Terminal T1 is connected to the positive bus and terminal T2 is connected to the anode of SCR2. A spike pulse is produced between terminals T1 and T2. A terminal T3 is connected to the reference point A. A generally saw tooth shaped pulse having an exponential rise is produced between the terminals T1 and T3. These terminals may be used to actuate load equipment if desired, the high energy spike pulses of terminals T1 and T2 probably being most useful.

In the operation of the circuit of FIG. 3, as in the operation of the other figures, the end of the timing period, here an oscillation, occurs when the potential is at least substantially equalized between the reference points A and B. The reference point B is fixed in voltage while the reference point A is moving from 12 volts towards zero volts as the capacitor C7 becomes charged. At substantial equalization there is a small voltage drop across the diode CR3 of perhaps one half a volt and the gate of SCR2 requires about two-tenths of a volt. Thus the reference points A and B may actually differ by about seven tenths of a volt while being substantially equalized. At this point the controlled rectifier CR2 is triggered discharging the capacitor C7.

The constants of the voltage divider resistors R15 and R16 were conveniently selected, respectively, to provide about one time constant or 63 and 37 per cent of the bus voltage. Thus with a 12 volt bus the potential at reference point B is about 4.5 volts and the voltage at reference point A lowers to about 3.8 volts causing the controlled receifier SCR2 to trigger and discharge the 200 mfd capacitor C7. Recharge of the capacitor 7 through the 500 ohm resistor R12 provides about ten pulses per second. By substitution of components of other values the pulse rate alternatively may be lowered or raised. Probably the high value is of the order of one thousand pulses or more per second.

The following circuit components were used in the commercial embodiment of the invention set out in FIGS. 2 and 3 and are given by way of example of working circuits.

| | |
|---|---|
| Transistor Q1 | 2N5367 |
| Silicon controlled rectifier SCR1 and SCR2 | GE C106B2 |
| Diodes CR1, CR2 and CR3 | 1N4822 |
| Potentiometer R8 | 5K |
| Resistor R1 | 50K for a 0.2 second timing period |
| Resistor R1 seconds timing period | 15 megohms for a 60 |
| Resistor R4 | 10K |
| Resistor R5 | 100 |
| Resistor R6 | 150 |
| Resistor R7 | 68K |
| Resistor R9 | 51 |
| Resistor R10 | 5.1 K |
| Resistor R11 | 51K |

| | |
|---|---|
| Resistor R12 | 500. |
| Resistor R13 | 10K |
| Resistor R14 | 10. |
| Resistor R15 | 630 |
| Resistor R16 | 370 |
| Capacitor C | 2.0 mfd 200V |
| Capacitor C1 | 20. mfd 200V |
| Capacitors C3, C4, C5 | 0.1 mfd 200V |
| Capacitor C6 | 0.01 mfd 1000 V |
| Capacitor C7 | 200 mfd. |

Tests were made varying the supply voltage from 90 to 140 volts showing no variation in the timing cycle with any given set of circuit constants.

While the invention has been described and illustrated with relation to specific embodiments thereof, it will be understood that other embodiments may be resorted to without departing from the invention. Certain variations may be made in the circuit, for example, in the event it is desired to provide the load with a no voltage timed interval rather than with a voltage timed interval the normally open contacts K1 would be replaced with normally closed contacts. In using the circuit of FIG. 2 as an oscillator suitable means would be provided for actuating the manual switch S1 at the desired rate or, of course, it might be replaced by electronic means. Therefore, the form of the invention set out above should be considered as illustrative and not as limiting the scope of the following claims.

We claim:

1. A timing circuit comprising a source of direct current, capacitor means, resistor means connected in series with said capacitor means and forming therewith a series circuit, said series circuit forming a first reference point between said resistor means and said capacitor means, voltage divider means having a tap and connected in parallel with said series circuit across said source of direct current, said voltage divider means forming at said tap a second reference point, control means responsive to substantially equal voltages at said reference points and connected between said reference points, and starting means for starting a timing sequence; said starting means including closeable connector means connected across said capacitor means for discharging said capacitor means when closed, switch means actuated by said control means responsive to substantially equal voltages between said reference points for closing said connector means when actuated and for opening said connector means when unactuated, and manually operable bypass means for closing and then opening said connector means regardless of the actuation of said switch means.

2. A timing circuit as in claim 1, further comprising network means having a line, said connector means including regulator means for opening and closing the line.

3. A timing circuit as in claim 1, wherein said connector means comprises a relay having a normally open contact connected across said capacitor means.

4. A timing circuit as in claim 3, wherein said relay includes a normally closed contact connected in a line to a load.

5. A timing circuit as in claim 3, wherein said switch means includes a bistable device which when actuated remains actuated until commuted.

6. A timing circuit as in claim 3, wherein said bypass means is connected to commute said switch means when said bypass means is closed and to release said switch means when said bypass means is open.

7. A timing circuit as in claim 1, wherein said connector means includes a relay having a coil connected in series with said switch means, said relay having a normally open contact connected across said capacitor means.

8. A timing circuit as in claim 7, wherein said relay further includes normally closed contact means connected in a line to a load.

9. A timing circuit as in claim 7, wherein said switch means includes a bistable device which when actuated remains actuated until commuted.

10. A timing circuit as in claim 7, wherein said bypass means is connected to commute said switch means when said bypass means is closed and to release said switch means when said bypass means is open.

11. A timing circuit as in claim 10, wherein said switch means includes thyristor means and said bypass means includes a contactor connected across said thyristor means.

12. A timing circuit as in claim 11, wherein said actuator means includes a differentiating circuit for pulsing said thyristor.

13. A timing circuit as in claim 1, further comprising switching means for turning said source on and off, and actuator means responsive to said source being turned on for actuating said switch means.

14. A timing circuit as in claim 13, wherein said switch means includes a bistable device which when actuated remains actuated until commuted.

15. A timing circuit as in claim 14, wherein said bypass means is connected to commute said switch means when turned on.

* * * * *